United States Patent
Chae et al.

(10) Patent No.: US 11,386,675 B2
(45) Date of Patent: Jul. 12, 2022

(54) DEVICE AND METHOD FOR GENERATING VEHICLE DATA, AND SYSTEM

(71) Applicants: HYUNDAI MOTOR COMPANY, Seoul (KR); KIA MOTORS CORPORATION, Seoul (KR)

(72) Inventors: Su Hong Chae, Hwaseong-si (KR); Jun Soo Kim, Seoul (KR); Seung Yong Lee, Suwon-si (KR); Dong Hwi Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 33 days.

(21) Appl. No.: 16/999,904

(22) Filed: Aug. 21, 2020

(65) Prior Publication Data
US 2021/0073556 A1    Mar. 11, 2021

(30) Foreign Application Priority Data
Sep. 9, 2019    (KR) .................. 10-2019-0111712

(51) Int. Cl.
*G06T 7/50* (2017.01)
*G06V 20/56* (2022.01)
*G06T 7/70* (2017.01)
*G06F 16/29* (2019.01)
*G05D 1/02* (2020.01)

(52) U.S. Cl.
CPC .......... *G06V 20/588* (2022.01); *G05D 1/0246* (2013.01); *G06F 16/29* (2019.01); *G06T 7/50* (2017.01); *G06T 7/70* (2017.01); *G06T 2207/30256* (2013.01)

(58) Field of Classification Search
CPC .......... G06K 9/00798; G06T 7/70; G06T 7/50
See application file for complete search history.

(56) References Cited

U.S. PATENT DOCUMENTS

| | | | | |
|---|---|---|---|---|
| 2008/0309762 | A1* | 12/2008 | Howard | G07C 5/0891 348/148 |
| 2020/0072616 | A1* | 3/2020 | Shi | G01C 21/30 |
| 2020/0134054 | A1* | 4/2020 | Viswanathan | G06F 16/29 |
| 2020/0346665 | A1* | 11/2020 | Ara jo | B60W 30/09 |

* cited by examiner

*Primary Examiner* — Myron Wyche
(74) *Attorney, Agent, or Firm* — Morgan, Lewis & Bockius LLP

(57) ABSTRACT

A vehicle may include a camera for capturing a region around the vehicle, a positioning sensor for measuring a position of the vehicle, a database for storing a precise map, and a learning data generating apparatus for generating data for learning based on the captured region, the position of the vehicle, and the precise map.

16 Claims, 6 Drawing Sheets

DEVICE AND METHOD FOR GENERATING VEHICLE DATA, AND SYSTEM

CROSS-REFERENCE TO RELATED APPLICATION

The present application claims priority to and the benefit of Korean Patent Application No. 10-2019-0111712, filed on Sep. 9, 2019, the entire contents of which are incorporated herein by reference.

TECHNICAL FIELD

The present disclosure relates to a device and a method for generating vehicle data, and a system.

BACKGROUND

The statements in this section merely provide background information related to the present disclosure and may not constitute prior art.

Deep-learning may obtain learning data with a high reliability because the deep-learning learns a large amount of data to derive a result.

When applying the deep-learning to recognize a lane, a road, or a center line, an accuracy of recognizing the lane, the road, or the center line may be improved.

However, such deep-learning should generate data for learning by collecting a large amount of data using a network.

In addition, generation of data of ground truth is very important for the deep-learning. In most cases, humans write the data for learning by directly indicating the ground truth on each frame of an image. Therefore, whenever needed to start or improve learning, it takes a lot of time and cost to generate a huge amount of data for learning.

SUMMARY

The present disclosure has been made to solve the above-mentioned problems occurring in the prior art while advantages achieved by the prior art are maintained intact.

An aspect of the present disclosure provides a device and a method for generating vehicle data, and a system that generate and provide data for learning about a lane, a road center line, and the like using information about a camera image captured at a position of a vehicle calculated by precise positioning and a precise map to minimize time and cost of generating a large amount of data for learning and improve a learning performance.

Another aspect of the present disclosure provides a device and a method for generating vehicle data, and a system that transmit information of a result of learning using data for learning from a server to each vehicle to improve a traveling performance of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle data generating device includes a camera for capturing a region around a vehicle, a positioning sensor for measuring a position of the vehicle, a database for storing a precise map, and a learning data generating apparatus for generating data for learning based on a captured image of the camera, the position of the vehicle, and the precise map.

According to another aspect of the present disclosure, a method for generating vehicle data includes collecting camera image information, collecting precise positioning information, obtaining shape information from a precise map based on the precise positioning information, mapping the shape information to a corresponding region of the camera image information, and generating data for learning based on a result of the mapping of the shape information.

According to another aspect of the present disclosure, a system for generating vehicle data includes a server for receiving data for learning and performing deep-learning machine-learning based on the data for learning to generate learning result information, and a first vehicle including a vehicle data generating device for generating the data for learning and receiving the learning result information.

Further areas of applicability will become apparent from the description provided herein. It should be understood that the description and specific examples are intended for purposes of illustration only and are not intended to limit the scope of the present disclosure.

DRAWINGS

The above and other objects, features and advantages of the present disclosure will be more apparent from the following detailed description taken in conjunction with the accompanying drawings.

Figure 1:
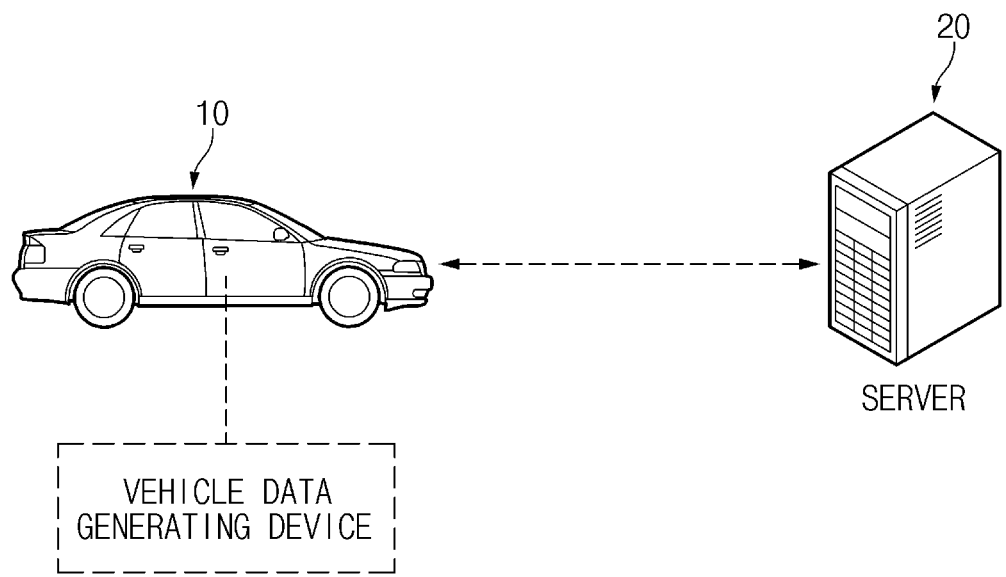
FIG. 1 is a diagram illustrating a configuration of a system to which a vehicle data generating device is applied in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a system to which a vehicle data generating device according to an embodiment of the present disclosure is applied.

Referring to FIG. 1, a system may include a vehicle data generating device 100 (shown in FIG. 2) and a server 20.

In this connection, the vehicle data generating device 100 according to the present disclosure may be implemented in a vehicle 10. In this connection, the vehicle data generating device 100 may be formed integrally with internal control units of the vehicle 10, or may be implemented as a separate device and connected to the control units of the vehicle by separate connection means.

The vehicle data generating device 100 generates data for learning, which is for deep-learning machine-learning for a lane and a center line of a road, and provides the data for learning to the server 20.

In this connection, the vehicle data generating device 100 may generate the data for learning for the lane, the road center line, and the like using information of a camera image captured at a position of the vehicle 10 calculated by precise positioning and a precise map, and provide the generated data for learning to the server 20.

The server 20 stores the data for learning provided from the vehicle data generating device 100. In this connection, the server 20 may receive and store each data for learning from each vehicle data generating device 100 disposed in each of the plurality of vehicles 10.

The server 20 may perform the deep-learning machine-learning using the stored data for learning, and may provide learning result information to each vehicle 10 in which each vehicle data generating device 100 is disposed. The deep-learning machine-learning, which is a technology used to cluster or classify objects or data, may extract a specific pattern of the data for learning to cluster or classify the objects or the data input based on the extracted specific pattern. In this connection, the greater the amount of the data for learning input into a deep-learning algorithm, the more accurate the classification or the clustering may be. The deep-learning machine-learning may include deep-learning techniques such as a deep neural network, a convolution deep neural network, and a deep belief network.

Thus, the vehicle 10 may more accurately recognize the lane and/or the center line of the road based on the learning result information provided from the server 20.

Thus, a detailed configuration and an operation of the vehicle data generating device 100 will be described in more detail with reference to an embodiment of FIG. 2.

Figure 2:
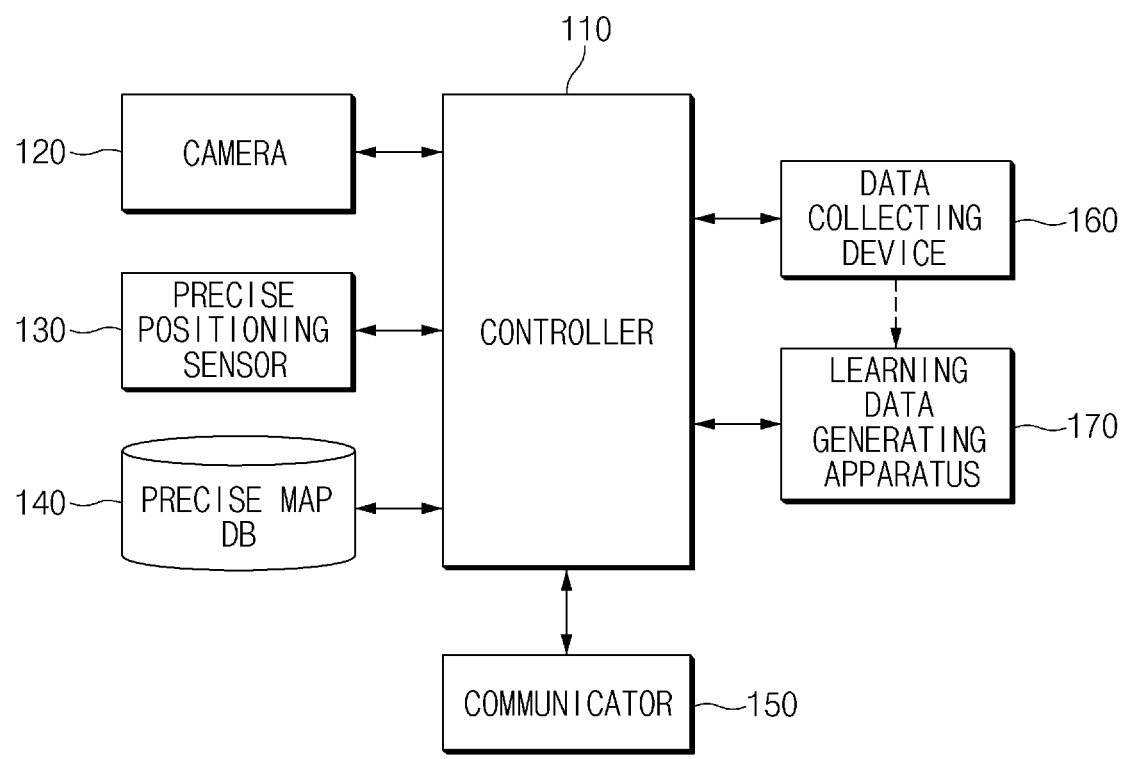
FIG. 2 is a diagram illustrating a configuration of a vehicle data generating device in one form of the present disclosure.

FIG. 2 is a diagram illustrating a configuration of a vehicle data generating device according to an embodiment of the present disclosure.

Referring to FIG. 2, the vehicle data generating device 100 may include a controller 110, a camera 120, a precise positioning sensor 130, a precise map DB (database) 140, a communicator 150, a data collecting device 160, and a learning data generating apparatus 170. In this connection, the controller 110, the data collecting device 160, and the learning data generating apparatus 170 of the vehicle data generating device 100 according to an embodiment of the present disclosure may be implemented as at least one processor.

The controller 110 may process signals transmitted and received between components of the vehicle data generating device 100.

The camera 120 is a device for capturing an image of a region around the vehicle.

As an example, the camera 120 may be a front camera disposed to face a region in front of the vehicle. When there is a request, the front camera may capture an image of the region in front of the vehicle in real time or at predetermined intervals, and transmit the captured image to the controller 110 and/or the data collecting device 160.

In this connection, the controller 110 may store the image (hereinafter, referred to as a 'camera image') transmitted from the camera 120 in the precise map DB (database) 140, and provide the camera image to the data collecting device 160.

The precise positioning sensor 130 refers to a device for measuring the position of the vehicle using a precise positioning technology.

A positioning technology refers to a technology for determining a position using information obtained through a navigation sensor, such as a GPS. The precise positioning technology refers to a technology detecting the position of the vehicle in a scheme of identifying the position of the vehicle using the positioning technology, calling a high precision map information around the vehicle, and comparing the high precision map information with sensor information collected while traveling in real time to correct the position of the vehicle.

In this connection, the precise positioning sensor 130 may be implemented in a form in which a plurality of sensors are coupled with each other.

The precise positioning sensor 130 may be synchronized with the camera 120 to detect a vehicle position at a time when the camera image is captured. The precise positioning sensor 130 may transmit detected vehicle position information to the controller 110 and/or the data collecting device 160.

In this connection, the controller 110 may store the vehicle position information transmitted from the precise positioning sensor 130 in the precise map DB (database) 140, and provide the vehicle position information to the data collecting device 160.

A precise map built in advance is stored in the precise map DB (database) 140.

In this connection, the precise map DB (database) 140 may include a storage medium such as a RAM (Random Access Memory), an SRAM (Static Random Access Memory), a ROM (Read-Only Memory), a PROM (Programmable Read-Only Memory), and an EEPROM (Electrically Erasable Programmable Read-Only Memory). The precise map DB (database) 140 may include the storage medium, and information required for generating the data for learning other than the precise map built in advance may be stored in the storage medium. For example, the precise map DB (database) 140 may further store the camera image captured by the camera 120 and the vehicle position information detected by the precise positioning sensor 130.

The communicator 150 may include a communication module for a vehicle network communication with electronic devices and/or control units arranged in the vehicle. As an example, the communication module may support a vehicle network communication between the controller 110, the camera 120, the precise positioning sensor 130, the precise map DB (database) 140, the data collecting device 160, and the learning data generating apparatus 170, and may receive signals output from each device and transmit the received signals.

In this connection, as a vehicle network communication technology, a CAN (Controller Area Network) communication, a LIN (Local Interconnect Network) communication, a Flex-Ray communication, an Ethernet, and the like may be included.

In addition, the communicator 150 may further include a communication module for wireless communication with the server 20 (shown in FIG. 1). As an example, the communication module may transmit/receive signals with the server 20 through a wireless Internet communication or a short-range communication.

In this connection, as a wireless Internet communication technology, a WLAN (Wireless LAN), a WiBro (Wireless Broadband), a Wi-Fi, a WiMAX (World Interoperability for Microwave Access), and the like may be included.

In addition, as a short-range communication technology, a Bluetooth, a ZigBee, a UWB (Ultra Wideband), a RFID (Radio Frequency Identification), an IrDA (Infrared Data Association), and the like may be included.

When the vehicle position information is received from the precise positioning sensor 130 or the controller 110, the data collecting device 160 may call the precise map stored in the precise map DB (database) 140, and collect precise map information corresponding to vehicle position information from the called precise map. For example, the data collecting device 160 may collect shape information about a lane and/or a center line of the road on the precise map corresponding to the vehicle position in the precise map stored in the precise map DB (database) 140. In this connection, the precise map information may include the shape information about the lane and/or the center line of the road on the precise map.

The learning data generating apparatus 170 generates the data for learning using the camera image and the precise map information collected by the data collecting device 160. In this connection, the learning data generating apparatus 170 maps the precise map information to the camera image. For example, the learning data generating apparatus 170 maps the shape information about the lane and/or the center line of the road on the precise map to a corresponding region of the camera image. In this connection, the learning data generating apparatus 170 may receive the collected camera image and the precise map information directly from the data collecting device 160 when generating learning data. In addition, when the learning data generating apparatus 170 generates the learning data, the controller 110 may receive the collected camera image and precise map information from the data collecting device 160, and transmit the collected camera image and precise map information to the learning data generating apparatus 170.

The learning data generating apparatus 170 may perform the mapping after performing a separate pre-processing process to be fit for a data format of the machine-learning when mapping the precise map information to the camera image.

For example, when generating a front 3D image intactly as the data for learning, the learning data generating apparatus 170 may perform coordinate transform on information on the precise map based on 3D, and then map the corresponding information to the camera image.

In addition, when generating the data for learning in a bird eye view, the learning data generating apparatus 170 may convert the camera image based on a corresponding coordinate system and combine the converted camera image with the information on the precise map.

In addition, the learning data generating apparatus 170 may perform various pre-processing processes required for the deep-learning, such as contrast conversion and/or rotation in left and right directions, before mapping the precise map information to the camera image.

The learning data generating apparatus 170 may generate the camera image to which the precise map information is mapped as the data for learning, and may store the generated data for learning in the precise map DB (database) 140.

When the data for learning is generated by the learning data generating apparatus 170, the controller 110 transmits the generated data for learning to the server connected through the communicator 150.

In addition, when a learning result for the data for learning is received from the server 20, the controller 110 may provide received learning result data to a traveling system for controlling the traveling of the vehicle, a lane recognition system for recognizing the lane, or the like.

The vehicle data generating device 100 according to the present embodiment operating as described above may be implemented in a form of an independent hardware device including a memory and a processor for processing each operation, or may be operated in a form of being included in another hardware device such as a microprocessor or a general purpose computer system.

Figure 3:
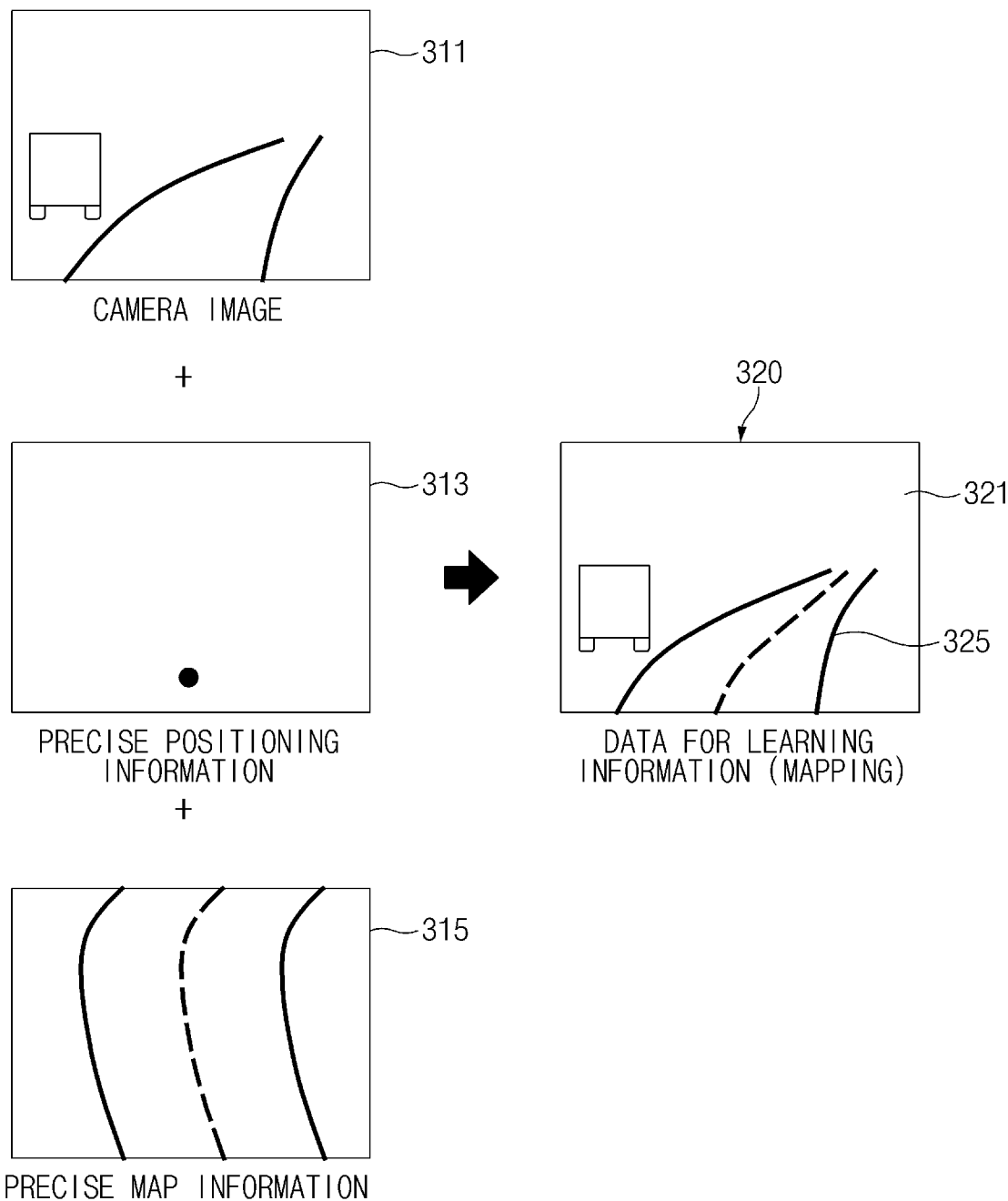
FIG. 3 is a diagram illustrating an embodiment referred to describe an operation of generating learning data of a vehicle data generating device in one form of the present disclosure.

FIG. 3 is a diagram illustrating an embodiment referred to describe an operation of generating learning data of a vehicle data generating device according to an embodiment of the present disclosure.

Referring to FIG. 3, the vehicle data generating device 100 may generate data for learning 320 using a camera image 311 obtained from the camera 120, precise positioning information 313 obtained from the precise positioning sensor 130, and precise map information 315 obtained from the precise map DB (database) 140.

In this connection, the vehicle data generating device 100 may obtain the precise map information 315 on the precise map based on the precise positioning information 313. A lane and/or a center line of a road, and the like of a corresponding region on the precise map may be included as the precise map information. In addition, the precise map information may include information that may be characteristically recognized in the corresponding region.

When the vehicle position information is received from the precise positioning sensor 130 or the controller 110, the data collecting device 160 may call the precise map stored in the precise map DB (database) 140 and collect the precise map information corresponding to the vehicle position information from the called precise map. For example, the data collecting device 160 may collect the shape information about the lane and/or the center line of the road on the precise map corresponding to the vehicle position in the precise map.

The learning data generating apparatus 170 generates the data for learning using the camera image and the precise map information collected by the data collecting device 160. In this connection, the learning data generating apparatus 170 maps the precise map information to the camera image. For example, the learning data generating apparatus 170 maps the shape information about the lane and/or the center line of the road on the precise map to the corresponding region of the camera image.

The learning data generating apparatus 170 may perform the mapping after proceeding a separate pre-processing process to be fit for the data format of the machine-learning when mapping the precise map information to the camera image.

For example, when generating the front 3D image intactly as the data for learning, the learning data generating apparatus 170 may perform the coordinate transform on the information on the precise map based on the 3D, and then map the corresponding information to the camera image.

In addition, when generating the data for learning in the bird eye view, the learning data generating apparatus 170 may convert the camera image based on the corresponding coordinate system and combine the converted camera image with the information on the precise map.

In addition, the learning data generating apparatus 170 may perform the various pre-processing processes required for the deep-learning, such as the contrast conversion and/or the rotation in the left and the right directions, before mapping the precise map information to the camera image.

The learning data generating apparatus 170 may generate the camera image to which the precise map information is mapped as the data for learning, and may store the generated data for learning in the precise map DB (database) 140.

Figure 4:
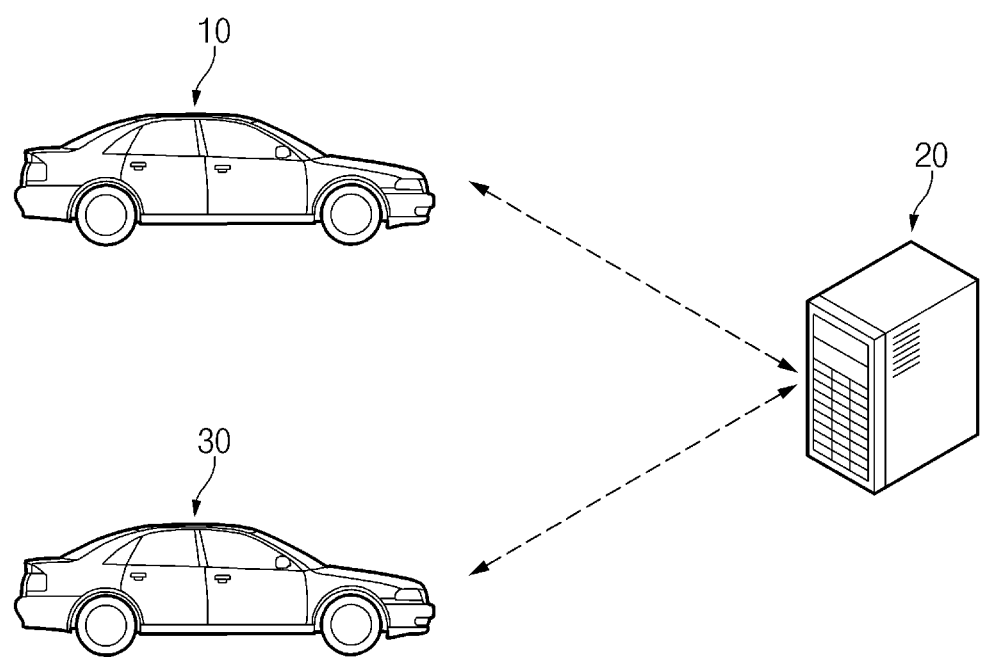
FIG. 4 is a diagram illustrating a configuration of a system in one form of the present disclosure.

FIG. 4 is a diagram illustrating a configuration of a system according to another embodiment of the present disclosure.

Referring to FIG. 4, the system may include the first vehicle 10, the server 20, and a second vehicle 30.

As shown in FIGS. 1 and 2, the first vehicle 10 may include the vehicle data generating device 100. The first vehicle 10 may include the vehicle data generating device 100 therein. The vehicle data generating device 100 disposed in the first vehicle 10 may be formed integrally with internal control units of the first vehicle 10, or may be implemented as a separate device and connected to the control units of the first vehicle 10 by separate connection means.

The vehicle data generating device 100 disposed in the first vehicle 10 may generate the data for learning, which is for the deep-learning machine-learning for the lane and the center line of the road, and provide the data for learning to the server 20. In this connection, the vehicle data generating device 100 may generate the data for learning for the lane, the road center line, and the like using information of a camera image captured at a position of the first vehicle 10 calculated by precise positioning and a precise map, and provide the generated data for learning to the server 20.

Referring to FIG. 2, the vehicle data generating device 100 disposed in the first vehicle 10 may include the controller 110, the camera 120, the precise positioning sensor 130, the precise map DB (database) 140, the communicator 150, and the data collecting device 160, and the learning data generating apparatus 170.

The controller 110 may process the signals transmitted and received between components 120 to 170 of the vehicle data generating device 100.

The camera 120 is the device for capturing the image of the region around the vehicle. As an example, the camera 120 may be the front camera disposed to face the region in front of the vehicle. When there is the request, the front camera may capture the image of the region in front of the vehicle in real time or at predetermined intervals, and transmit the captured image to the controller 110 and/or the data collecting device 160. In this connection, the controller 110 may store the image captured from the camera 120 in the precise map DB (database) 140, and provide the image to the data collecting device 160.

The precise positioning sensor 130 refers to the device for measuring the position of the vehicle using the precise positioning technology. For example, the precise positioning sensor 130 may be implemented in the form in which the plurality of sensors are coupled with each other. The precise positioning sensor 130 may be synchronized with the camera 120 to detect the vehicle position at the time when the camera image is captured. The precise positioning sensor 130 may transmit detected vehicle position information to the controller 110 and/or the data collecting device 160. In this connection, the controller 110 may store the vehicle position information transmitted from the precise positioning sensor 130 in the precise map DB (database) 140, and provide the vehicle position information to the data collecting device 160.

The precise map built in advance may be stored in the precise map DB (database) 140. In this connection, the precise map DB (database) 140 may include the storage medium such as the RAM (Random Access Memory), the SRAM (Static Random. Access Memory), the ROM (Read-Only Memory), the PROM (Programmable Read-Only Memory), and the EEPROM (Electrically Erasable Programmable Read-Only Memory). The precise map DB (database) 140 may include the storage medium, and information required for generating the data for learning other than the precise map built in advance may be stored in the storage medium. For example, the precise map DB (database) 140 may further store the camera image captured by the camera 120, the vehicle position information detected by the precise positioning sensor 130, and the like.

The communicator 150 may include the communication module for the vehicle network communication with electronic devices and/or the control units arranged in the first vehicle 10. For example, the communicator 150 may support the vehicle network communication between the controller 110, the camera 120, the precise positioning sensor 130, the precise map DB (database) 140, the data collecting device 160, and the learning data generating apparatus 170. In addition, the communicator 150 may further include the communication module for wireless communication with the server 20.

When the vehicle position information is received from the precise positioning sensor 130 or the controller 110, the data collecting device 160 may call the precise map stored in the precise map DB (database) 140, and collect the precise map information corresponding to the vehicle position information from the called precise map. For example, the data collecting device 160 may collect the shape information about the lane and/or the center line of the road on the precise map corresponding to the vehicle position.

The learning data generating apparatus 170 may generate the data for learning using the camera image and the precise map information collected by the data collecting device 160. For example, the learning data generating apparatus 170 may map the shape information about the lane and/or the center line of the road on the precise map, that is, the precise map information, to the corresponding region of the camera image. Further, the learning data generating apparatus 170 may perform the separate pre-processing process on the precise map information to be fit for the data format of the machine-learning, and then, map the pre-processed precise map information with the camera image. In this connection, when the data for learning is generated by the learning data generating apparatus 170, the controller 110 may store the generated data for learning in the precise map DB (database) 140 and transmit the data for learning to the server 20 through the communicator 150.

The server 20 may store the data for learning provided from the vehicle data generating device 100 disposed in the first vehicle 10. In this connection, the server 20 may receive each data for learning from each vehicle data generating device 100 disposed in each of the plurality of vehicles 10.

The server 20 may perform the deep-learning machine-learning using the stored data for learning, and may provide the learning result information to the first vehicle 10 and the second vehicle 30.

The second vehicle 30 may receive information of a result of the deep-learning machine-learning performed by the server 20. The second vehicle 30 may process an image captured by a camera disposed in the second vehicle 30 based on the information of the result of the deep-learning machine-learning performed by the server 20. Therefore, the second vehicle 30 processes the image captured by the camera using the deep-learning machine-learning result information of the deep-learning machine-learning performed based on the data for learning provided from the first vehicle 10, so that a performance of an autonomous driving may be further improved.

Unlike the first vehicle 10 in which the vehicle data generating device 100 is disposed, the second vehicle 30 may not include the precise positioning sensor and the precise map DB. That is, unlike the first vehicle 10, the second vehicle 30 may not include the precise positioning sensor and the precise map DB for generating the data for learning, and may include only components required for the autonomous driving. For example, referring to FIG. 2, the second vehicle 30 may include the controller 110, the camera 120, the communicator 150, the data collecting device 160, and the learning data generating apparatus 170 therein.

The system according to another embodiment of the present disclosure shown in FIG. 4 discloses the first vehicle that may generate the data for learning using the precise positioning sensor and the precise map DB, the server that receives the data for learning from the first vehicle to perform the deep-learning machine-learning, and stores the learning result information therein, and the first vehicle and the second vehicle that receive the learning result from the server and travel autonomously. In this connection, the first and second vehicles may be autonomous vehicles, and the first vehicle may be a vehicle that may generate the data for learning that may be used for the deep-learning machine-learning of the server.

Figure 5:
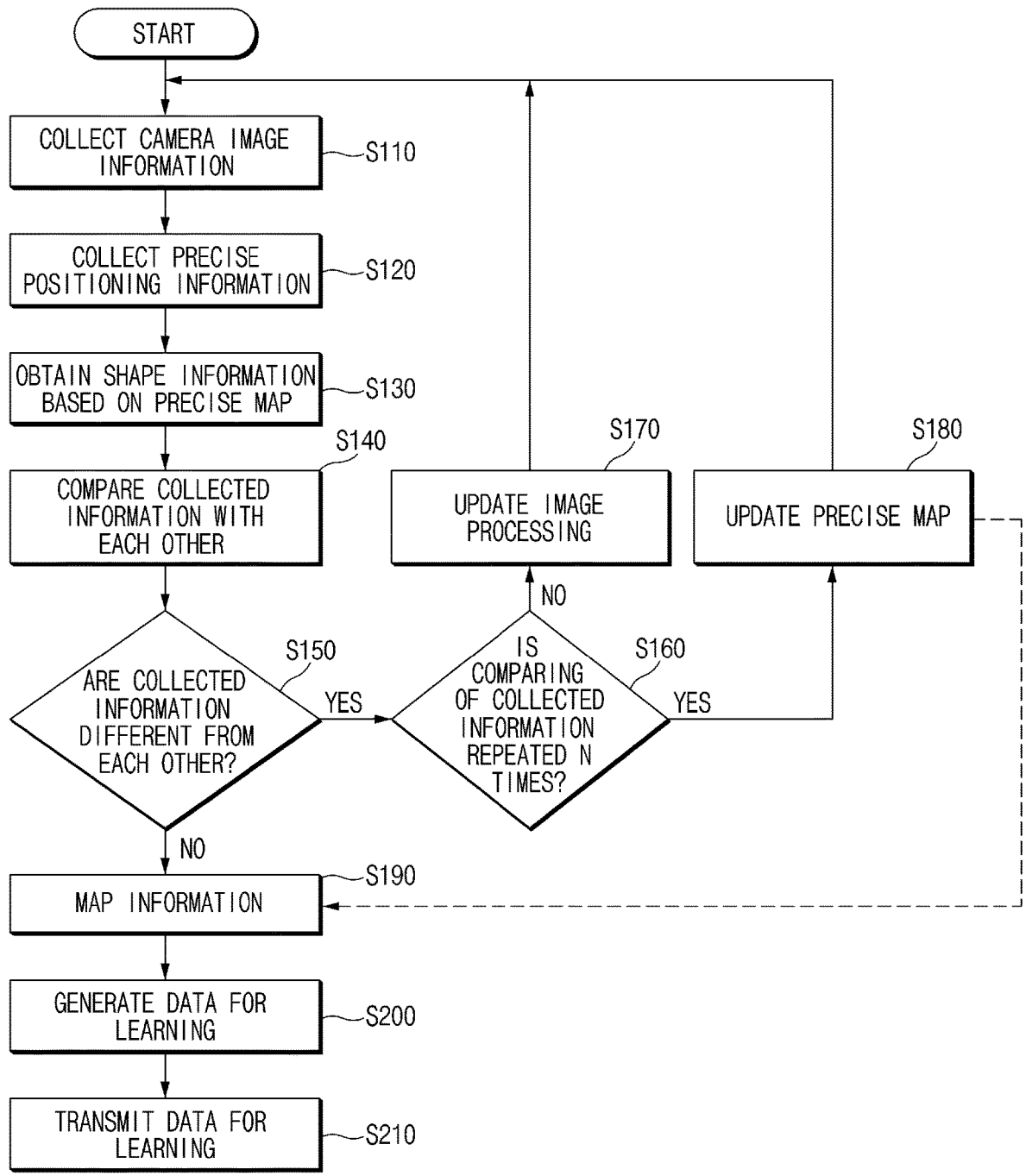
FIG. 5 is a diagram illustrating an operation flow for a method for generating vehicle data in one form of the present disclosure.

FIG. 5 is a diagram illustrating an operation flow for a method for generating vehicle data according to an embodiment of the present disclosure. The method for generating the vehicle data illustrated in FIG. 5 will be described with reference to FIG. 2 illustrating the vehicle data generating device according to an embodiment.

Collecting the camera image information (S110) may include collecting the image captured the region around the vehicle from the camera 120 disposed in the vehicle. In this connection, the controller 110 may store the image captured by the camera 120 in the precise map DB (database) 140 and provide the image to the data collecting device 160.

Collecting the precise positioning information (S120) may include measuring the position of the vehicle from the precise positioning sensor 130. For example, the collecting of the precise positioning information S120 may be synchronized with the camera 120 to detect the vehicle position at the time when the camera image is captured. In this connection, the controller 110 may store the vehicle position information transmitted from the precise positioning sensor 130 in the precise map DB (database) 140 and provide the vehicle position information to the data collecting device 160.

Obtaining the shape information based on the precise map (S130) may include calling the precise map from the precise map DB (database) 140 in which the precise map is stored. In this connection, the controller 110 may provide the precise map stored in the precise map DB (database) 140 to the data collecting device 160.

Comparing the collected information with each other (S140) may include comparing the information collected in the data collecting device 160 with each other. For example, the comparing of the collected information with each other (S140) may include comparing the information of the image captured by the camera 120 with the information of the precise map called from the precise map DB (database) 140. In this connection, the controller 110 or the data collecting device 160 may compare the information of the image captured by the camera 120 with the precise map information.

When the collected camera image information and precise map information are not different from each other (No), that is, the same with each other in the comparing of the collected information with each other S140 and S150, mapping the information (S190) may be performed.

The mapping of the information (S190) may include mapping the precise map information collected by the data collecting device 160 to the corresponding region of the camera image. In this connection, the learning data generating apparatus 170 may map the precise map information to the corresponding region of the camera image based on the precise map information and the camera image information collected by the data collecting device 160.

Generating the data for learning (S200) may include mapping the precise map information collected by the data collecting device 160 to the corresponding region of the camera image to generate the data for learning. In this connection, the learning data generating apparatus 170 may generate the data for learning based on the result of mapping the precise map information and the camera image information with each other performed in the mapping of the information (S190).

Transmitting the data for learning (S210) may include transmitting the generated data for learning to the server 20. In this connection, the communicator 150 may transmit the data for learning generated by the learning data generating apparatus 170 to the server 20 through the wired/wireless communication.

When the collected camera image information and precise map information are different from each other (Yes) in the comparing of the received information with each other in S140 and S150, updating image processing (S170) or updating the precise map DB (S180) may be performed.

When the camera image information and the precise map information are different from each other (Yes), the updating of the image processing (S170) may be repeatedly performed for the preset number of times (n times, n is a natural number).

In addition, when the updating of the image processing (S170) is repeated for equal to or more than the preset number of times, the updating of the precise map (S180) may be performed.

Therefore, the method for generating the vehicle data according to an embodiment of the present disclosure may further include selecting update (S160) of selecting one of the updating of the image processing (S170) and the updating of the precise map (S180) when the camera image information and the precise map information are different from each other in the comparing of the received information with each other in S140 and S150.

The selecting of the update (S160) may include primarily performing the updating of the image processing (S170) repeatedly until the camera image information and the precise map information are the same with each other when the camera image information and precise map information are different from each other, and selecting the updating of the precise map DB (S180) when the updating of the image processing (S170), which was repeatedly performed, is repeated for equal to or more than the preset number of times.

The updating of the image processing (S170) may include updating the camera image information that is a comparison target of the precise map information. The updating of the image processing (S170) may include returning to the collecting of the camera image information (S110).

The updating of the precise map (S180) may include updating the precise map that is the comparison target of the camera image information. The updating of the precise map (S180) may include receiving and storing the information about the precise map stored in the precise map DB (database) 140 from the server 20 or an external device. In addition, the updating of the precise map (S180) may include returning to the collecting of the camera image information (S110) after updating the precise map stored in the precise map DB (database) 140. In one example, the updating of the precise map (S180) may include performing the mapping of the information (S190) after updating the precise map stored in the precise map DB.

The device and the method for generating the vehicle data, and the system according to an embodiment of the present disclosure may automatically generate and provide the data for learning about recognition of the lane and the road center line based on the information about the camera image captured at the position of the vehicle calculated by the precise positioning and the precise map, so that time and cost of generating a large amount of data for learning may be minimized, and a learning performance may be improved. The device and the method for generating the vehicle data, and the system according to an embodiment of the present disclosure may transmit the information (the deep-learning machine-learning result) learned using the data for learning from the server to each vehicle, thereby improving a traveling performance of the vehicle.

Figure 6:
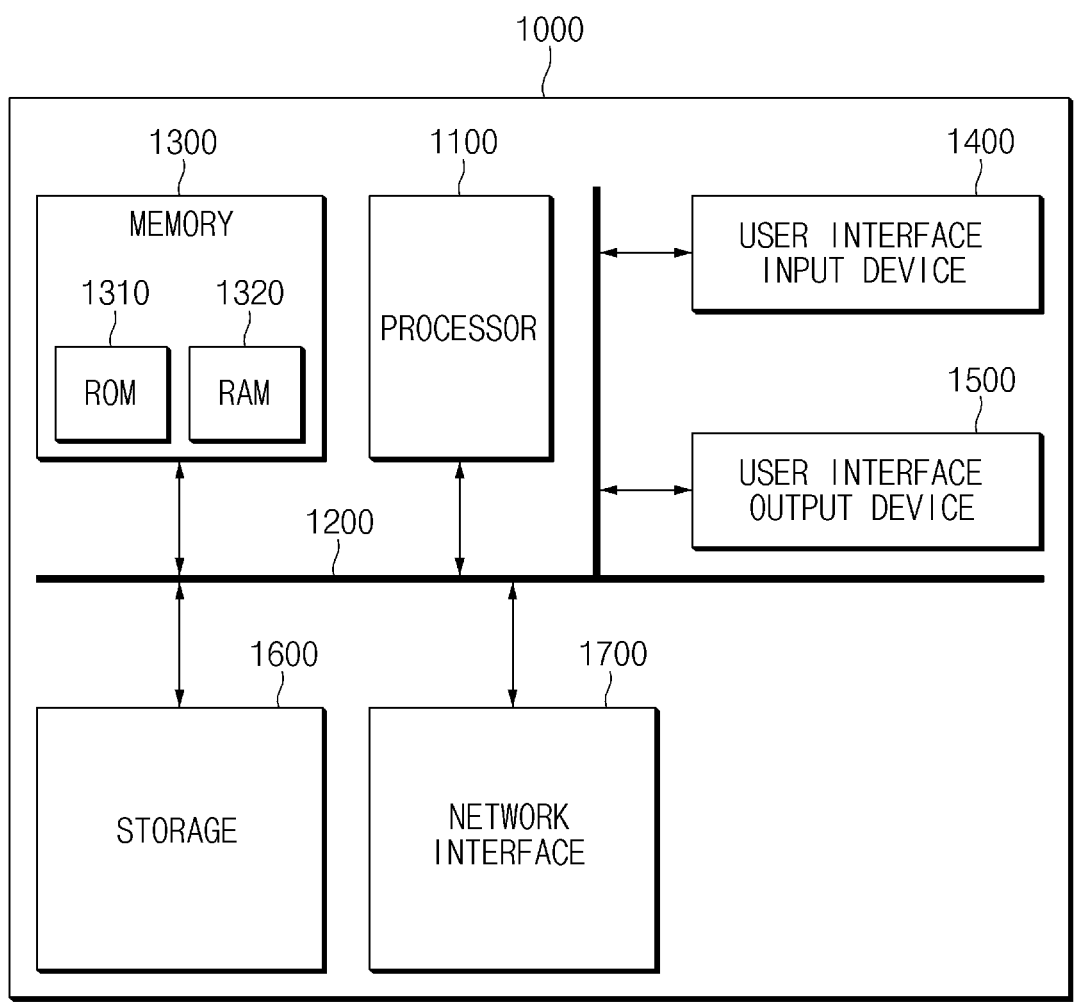
FIG. 6 illustrates a computing system in which a method is implemented in one form of the present disclosure.

FIG. 6 illustrates a computing system in which a method according to an embodiment of the present disclosure is implemented.

With reference to FIG. 6, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present disclosure, the data for learning about the lane, the road center line, and the like may be generated and provided using the information about the camera image captured at the position of the vehicle calculated by the precise positioning and the precise map, so that the time and the cost of generating the large amount of data for learning may be minimized, and the learning performance may be improved.

Further, according to the present disclosure, the information of the result of learning using the data for learning may be transmitted from the server to each vehicle, thereby improving the traveling performance of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle including a vehicle data generating device, the vehicle comprising:
   a camera configured to capture a region around the vehicle;
   a positioning sensor configured to measure a position of the vehicle;
   a database configured to store a precise map; and
   a learning data generating apparatus configured to generate data for learning based on the captured region, the position of the vehicle, and the precise map,
   wherein the learning data generating apparatus is configured to perform a separate pre-processing process to be fit for a data format of a machine-learning.

2. The vehicle of claim 1, wherein the positioning sensor is synchronized with the camera to measure the position of the vehicle at a capturing time of the camera.

3. The vehicle of claim 2, wherein the vehicle further comprises:
a data collecting device configured to collect information corresponding to the position of the vehicle in the precise map.

4. The vehicle of claim 3, wherein the learning data generating apparatus is configured to generate the data for learning based on the captured region and the precise map.

5. The vehicle of claim 4, wherein the precise map includes shape information of a lane and a center line of a road on the precise map.

6. The vehicle of claim 5, wherein the learning data generating apparatus is configured to map the shape information to a corresponding region of the captured region.

7. A system for generating vehicle data, the system comprising:
a server configured to:
receive data for learning; and
perform a machine-learning based on the data to generate learning result information; and
a first vehicle including a vehicle data generating device that is configured to generate the data and to receive the learning result information,
wherein the vehicle data generating device is configured to perform a separate pre-processing process to be fit for a data format of the machine-learning.

8. The system of claim 7, wherein the vehicle data generating device includes:
a camera configured to capture a region around the first vehicle;
a positioning sensor configured to measure a position of the first vehicle;
a database configured to store a precise map;
a data collecting device configured to collect information corresponding to the position of the first vehicle in the precise map; and
a learning data generating apparatus configured to generate the data for learning based on the captured region and the precise map.

9. The system of claim 8, wherein the learning data generating apparatus is configured to map shape information of a lane and a center line of a road on the precise map to a corresponding region of the captured region.

10. The system of claim 8, wherein the system further comprises:
a second vehicle configured to:
receive the learning result information from the server; and
travel autonomously.

11. A method for generating vehicle data, the method comprising:
collecting, by a camera, camera image information;
collecting, by a positioning sensor, precise positioning information;
obtaining, by a learning data generating apparatus, shape information from a precise map based on the precise positioning information;
performing, by the learning data generating apparatus, a separate pre-processing process to be fit for a data format of a machine-learning;
mapping, by the learning data generating apparatus, the shape information to a corresponding region of the camera image information; and
generating, by the learning data generating apparatus, data for learning based on the mapped shape information.

12. The method of claim 11, wherein the method further comprises:
transmitting the data for learning to a server.

13. The method of claim 11, wherein the method further comprises:
in response to obtaining the shape information, comparing the camera image information with the precise map.

14. The method of claim 13, wherein the method further comprises:
in response to comparing the camera image information with the precise map,
mapping the shape information when the camera image information and the precise map are matched; and
updating image processing when the camera image information and the precise map are not matched.

15. The method of claim 14, wherein the updating of the image processing includes:
repeatedly collecting the camera image information until the camera image information and the precise map are matched.

16. The method of claim 15, wherein the method further comprises:
updating the precise map when the image processing is updated repeatedly for a predetermined number of times.

* * * * *